Jan. 18, 1949.     F. L. CANTRALL ET AL     2,459,680
MOLD FILLING AND EJECTING APPARATUS
Filed Feb. 11, 1946     2 Sheets-Sheet 1
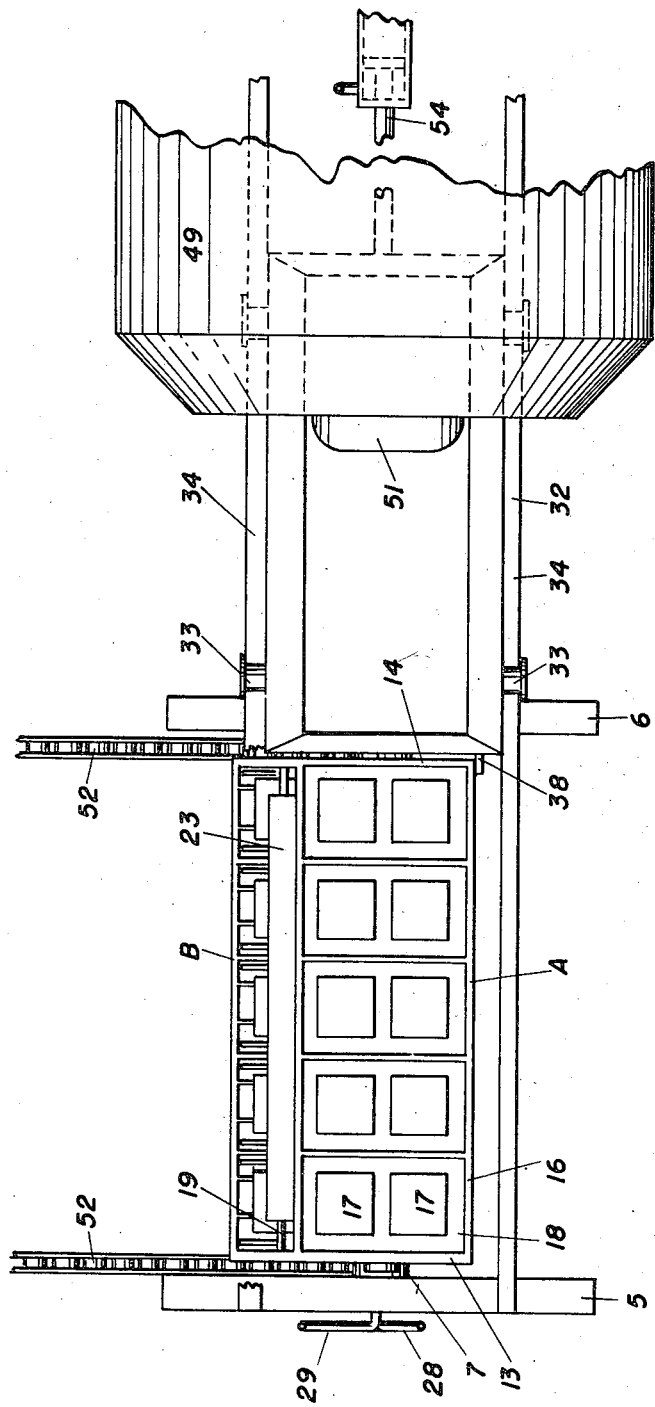
INVENTOR.
Forrest L. Cantrall
BY   John A. Carlisle
Att'y

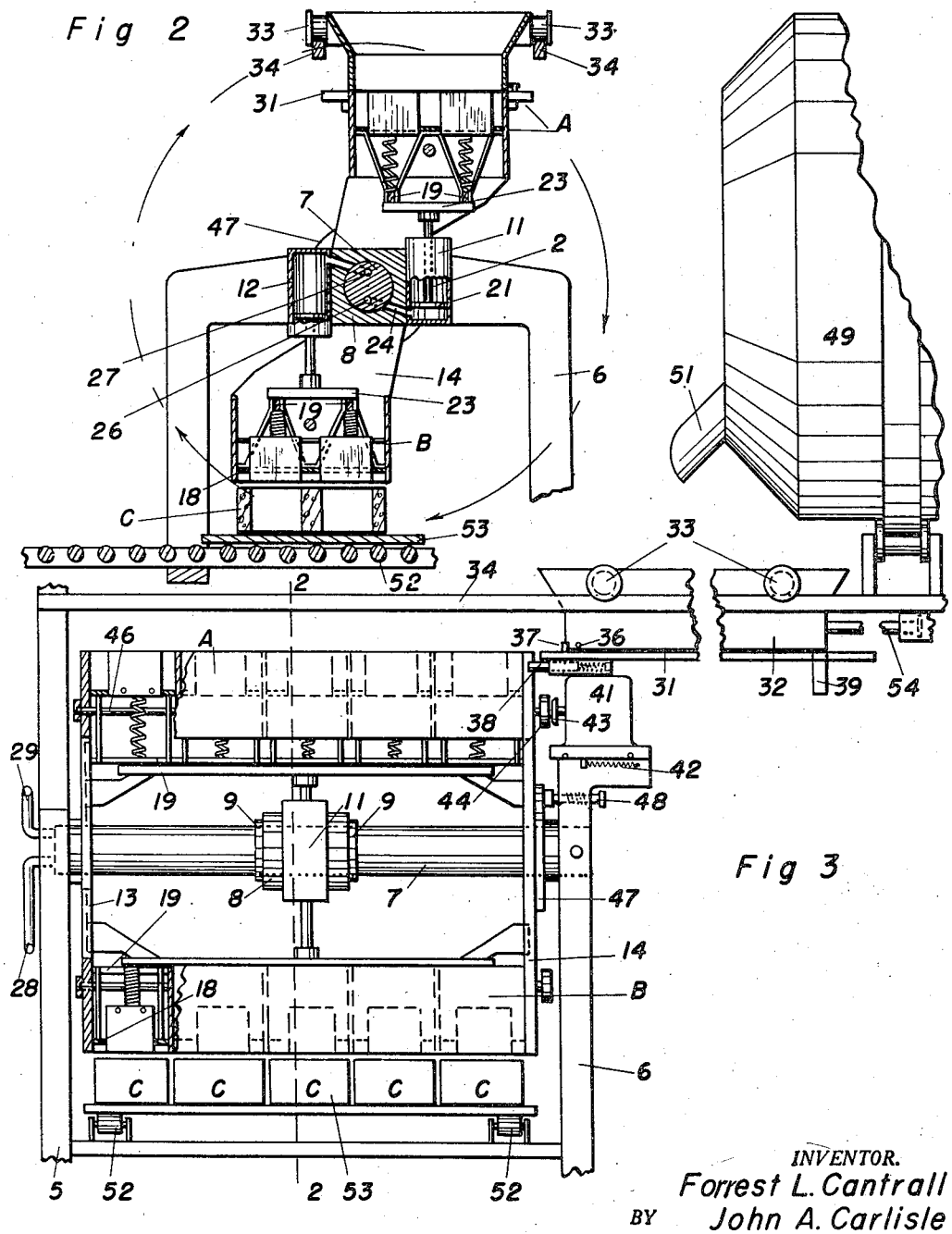

Patented Jan. 18, 1949

2,459,680

UNITED STATES PATENT OFFICE 2,459,680

MOLD FILLING AND EJECTING APPARATUS

Forrest L. Cantrall, Benicia, and John A. Carlisle, San Rafael, Calif., assignors to Shasta Volcolite Company, Benicia, Calif.

Application February 11, 1946, Serial No. 646,742

4 Claims. (Cl. 25—41)

This invention relates to improvements in brick molding devices, and has particular reference to the mold filling and ejecting apparatus.

The principal object of this invention is to provide an automatic machine which will deposit a plastic mixture in a mold, which mold will then be vibrated and later revolved to ejecting position, where the molded brick will be ejected onto a receiving platform to be conveyed to a remote point.

A further object is to provide automatic means for effecting the rotation of the mold from filling to ejecting position.

A further object is to produce a device of this character which is simple in construction, economical to manufacture and one wherein the parts will not become deranged through constant use.

Other objects and advantages will be apparent during the course of the following description.

In the accompanying drawings forming a part of this specification and in which like numerals are employed to designate like parts throughout the same, Fig. 1 is a top plan view of our device showing a fragmentary portion of the mixer.

Fig. 2 is a cross sectional view taken on the line 2—2 of Fig. 3 and showing the hopper superimposed upon the mold, and Fig. 3 is a side elevation of Fig. 1 showing a portion thereof in cross section.

In the molding of bricks, particularly the hollow type, that is brick having cored out openings therethrough, it has been customary to fill molds, to tamp them and to then let the brick set in the mold, that is harden, and to then eject the same manually for further curing.

This is a slow and tedious operation, requiring considerable strength by the handlers of the molds and bricks, thereby creating an expensive finished product and one which is apt to be misshapen due to the rough handling of the individual mold.

We have, therefore, devised a machine wherein a plastic mixture is dumped from a conveyor into a hopper, which hopper is moved to a point superimposed upon the mold to be filled, which mold is then vibrated to cause a settling of the mass in the mold, after which the hopper returns to its filling position and in so doing scrapes off the top of the mold, thus finishing the casting operation.

The hopper, in returning, also releases the mold so that it may be rotated about a fixed shaft into discharge position.

When the mold reaches discharging position a hydraulic ejecting mechanism is automatically actuated, which forces the cast brick from the mold onto a receiving platform, the transferring of the brick from the mold to the platform being a gentle operation, thereby eliminating any damage to the brick due to rough handling while it is still in an uncured condition.

In the accompanying drawings wherein for the purpose of illustration is shown a preferred embodiment of my invention, the numerals 5 and 6 designate spaced standards, which in turn support a fixed shaft 7, upon which is rotatably mounted a block 8, which is rotatably sealed to the shaft 7 by stuffing glands 9.

Mounted upon the block 8 is a pair of cylinders 11 and 12, the purpose of which will be later seen.

Also rotatably mounted upon the shaft 7 are end-plates 13 and 14, which in turn support therebetween molds designated as a whole by the letters "A" and "B" of the type shown in our co-pending application Serial Number 605,294, filed July 16, 1945, now Patent No. 2,402,368, which, briefly, consists of a plurality of casting chambers, as shown at 16 (see Fig. 1), in which cores 17 are positioned and are surrounded by an ejecting plate 18, moved through the medium of spring-supported ejector-bars 19.

The cylinders 11 and 12 above referred to are so mounted on the block 8 that they underly or overly, as the case may be, the ejector bars 19 of the molds A and B.

In each of the cylinders there is positioned a piston 21, which actuates a piston-rod 22, to which is connected an ejector-plate 23.

Each of these cylinders communicates through a port 24, with either of the bores 26 or 27 formed in the shaft 7.

Pipes 28 and 29 connected to the bores 26 and 27 respectively.

Referring now to Fig. 3, it will be noted that a plate 31 is mounted so as to have its top surface in a plane coinciding with the plane of the top of the mold A.

Slidably mounted on this plate is a hopper 32 which is supported by flanged wheels 33, which ride upon rails 34.

This hopper has a pin 36, which is adapted to engage a trip lever 37, for the purpose of actuating a latch 38 when the hopper moves in one direction only.

An arm 39 extends downwardly from the hopper 32 and is adapted to contact a motor 41, to move the same against the tension of a spring 42, so that a clutch disc 43 will engage a clutch 44 formed upon the end of the vibrator shaft 46 to actuate a vibrator such as described in our co-pending application Serial Number 605,293, filed July 16, 1945, and now abandoned.

At 47 I have shown a friction disc, which is contacted by an adjustable spring-pressed friction shoe 48.

Material is mixed in an ordinary mixer 49 and discharged through the chute 51 into the hopper 32.

Positioned beneath the mold "B" is a pair of roller-conveyors 52, which are adapted to support boards 53, so that the same may receive the ejected bricks, as shown at C, in Figs. 2 and 3.

As a result of this construction, when the parts are arranged, as shown in the figures, various materials to form the products are deposited in the mixer 49, and when thoroughly mixed, are conducted through the chute 51, into the hopper 32 and until the same has received a sufficient quantity to form one mold load.

Hydraulic means is now actuated by the operator, the hydraulic means being designated by the numeral 54, which causes the hopper to move toward the left of Fig. 3 until it reaches a position directly above and resting upon the edges of the mold A.

At this time the arm 39 will have pushed the motor 41 and the clutch 43 against the clutch 44, so that the shaft 46 will be rotated to set up a vibration in the mold, which will cause the plastic material which had dropped from the hopper into the mold to be agitated to form a homogeneous mass. (It might be here mentioned that this mixture is in a fairly dry state in comparison to the ordinary plastic mixture.)

The hopper is now returned to its starting position, and in so doing the pin 36 engages the trip-lever 37 and withdraws the latch 38 against the tension of its spring. Therefore, as the mold A is off center, with respect to a vertical plane extending through the axis of the shaft 7, it will be apparent that this loaded mold A will tend to rotate in a clockwise direction, as shown in Fig. 2, with the result that the mold A will move to the position of the mold B, and the mold B will move to the position of the mold A.

The brake-shoe 48 will serve to prevent too rapid rotation of the molds about the shaft 7, and the latch 38 will stop the mold B on its upward travel to the position previously occupied by the mold A. Therefore, the parts will come to rest with the loaded mold ready to be discharged onto the board 53.

The discharge is effected by the fact that as the block 8 rotates about the shaft 7, the port 24 of the cylinder 11 will come to rest in communication with the bore 27, and as this bore carries oil under pressure, the pressure will be transmitted through the piston in the cylinder 11, and consequently, the ejector-plate 23 will push downwardly on the ejector-bars 19, and move the ejector-plate 18 downwardly, as shown in Figs. 2 and 3, thus transferring the molded brick from the mold to the board 53, and ready to be moved along the conveyors 52 to a remote point for storage and curing.

When the original mold B has reached the top, or A. position, the expansion of the springs of the ejector mechanism will force the ejector-bars downwardly against the ejector-plate, thus forcing the piston in the cylinder 12 to discharge oil through its port into the bore 26 and back to the reservoir.

It will thus be seen that we have produced a device which is automatic in its operation in the casting and ejecting of bricks from a pair of molds, and that the apparatus will perform all of the objects above set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. A molding machine comprising a pair of spaced supports, a shaft carried by said supports, spaced end-plates mounted on said shaft and serving to support a molding apparatus adjacent their free ends, said molding apparatus including a mold, an ejector mechanism, and means carried by said shaft for actuating said ejector mechanism while one of said molds is in inverted dumping position, said means including a hydraulically actuated ejector plate, slideably mounted between said end-plates.

2. In a molding machine, a fixed shaft, a pair of spaced end-plates rotatable about said shaft, molds supported between the free ends of said plates, each of said molds having ejecting means, said molds being so arranged on said plates that when in filling and ejecting position they are offset on opposite sides with respect to a vertical line through the axis of said shaft, whereby a filled upper mold will overbalance when released and move through gravity to ejecting position.

3. In a molding machine, a fixed shaft having bores formed therein, a pair of spaced end-plates rotatable about said shaft, and supporting molds between the adjacent free ends of said plates, each of said molds having ejecting means, said molds being so arranged on said plates that when in filling and ejecting position they are offset on opposite sides with respect to a vertical line through the axis of said shaft whereby a filled upper mold will overbalance when released and move through gravity to ejecting position, and hydraulic means carried by said shaft and communicating with said bores when said molds are in filling and dumping position, whereby the ejecting means of said molds may be actuated at each half revolution of said molds about said shaft.

4. In a molding machine, a stationary shaft, mold supporting means mounted on said shaft and rotatable about the axis thereof, molding apparatus carried by the adjacent ends of said plates, said molding apparatus including an ejector mechanism and a vibrating mechanism, a slideable filling hopper having its bottom on the same plane as the top of the uppermost mold, whereby said hopper may be moved longitudinally to overly said mold, an arm carried by said hopper and engaging a slideable motor to engage and actuate the vibrating mechanism of the mold, and a releasing latch actuated by the movement of said hopper away from said mold to permit said mold to rotate about said shaft to an ejecting position.

FORREST L. CANTRALL.
JOHN A. CARLISLE.

REFERENCES CITED

The following references are of record in the file of this patent:

UNITED STATES PATENTS

| Number | Name | Date |
| --- | --- | --- |
| 1,765,064 | Eberling | June 17, 1930 |
| 2,234,604 | Peck | Mar. 11, 1941 |